Nov. 2, 1937.    C. G. STRANDLUND    2,097,678
CULTIVATOR AND PLANTER
Filed Nov. 3, 1933    4 Sheets-Sheet 1

WITNESS.
Edward Melin.

INVENTOR
Carl G. Strandlund
BY Brown, Jackson, Boettcher & Dienner
ATTORNEYS.

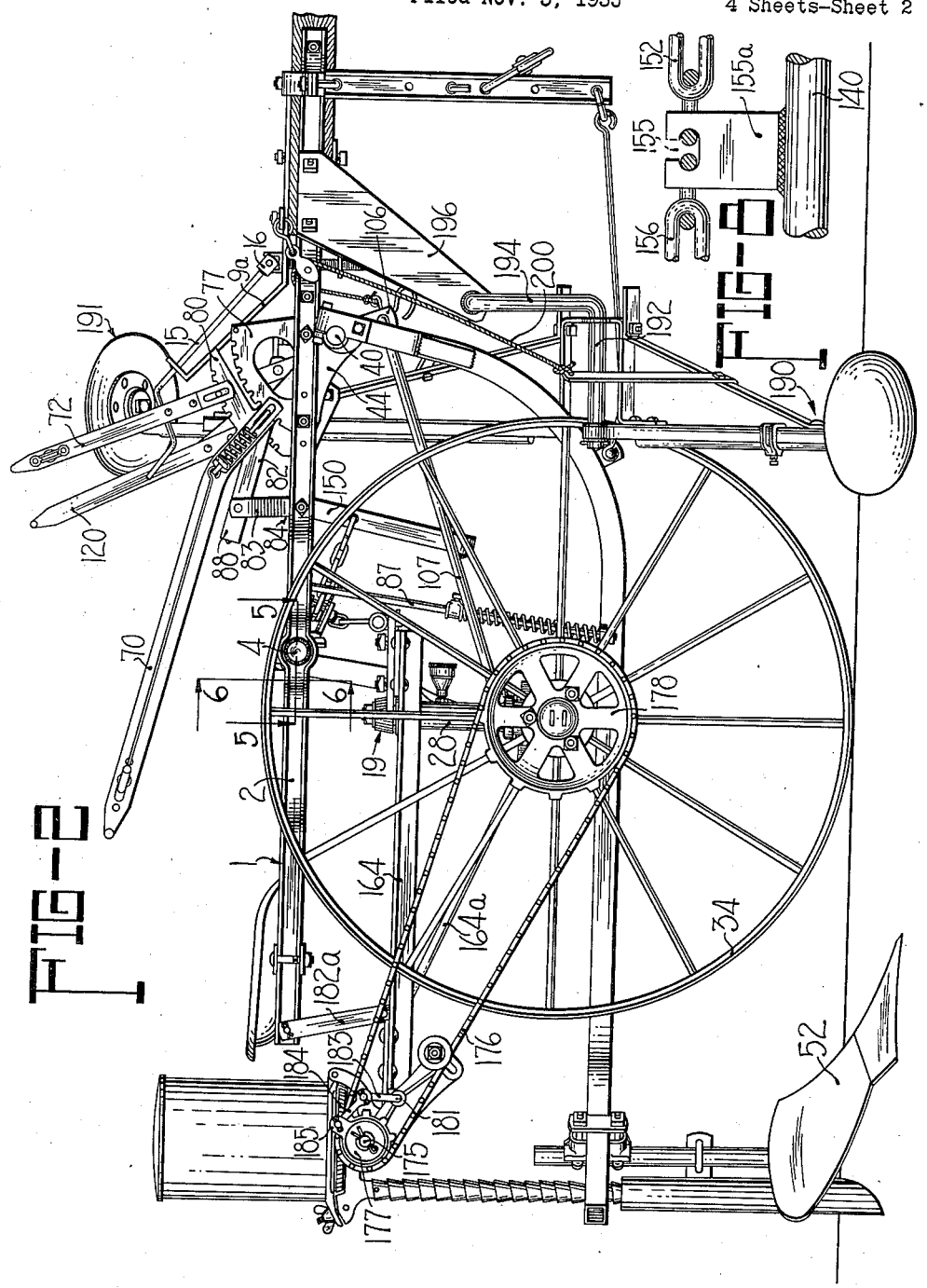

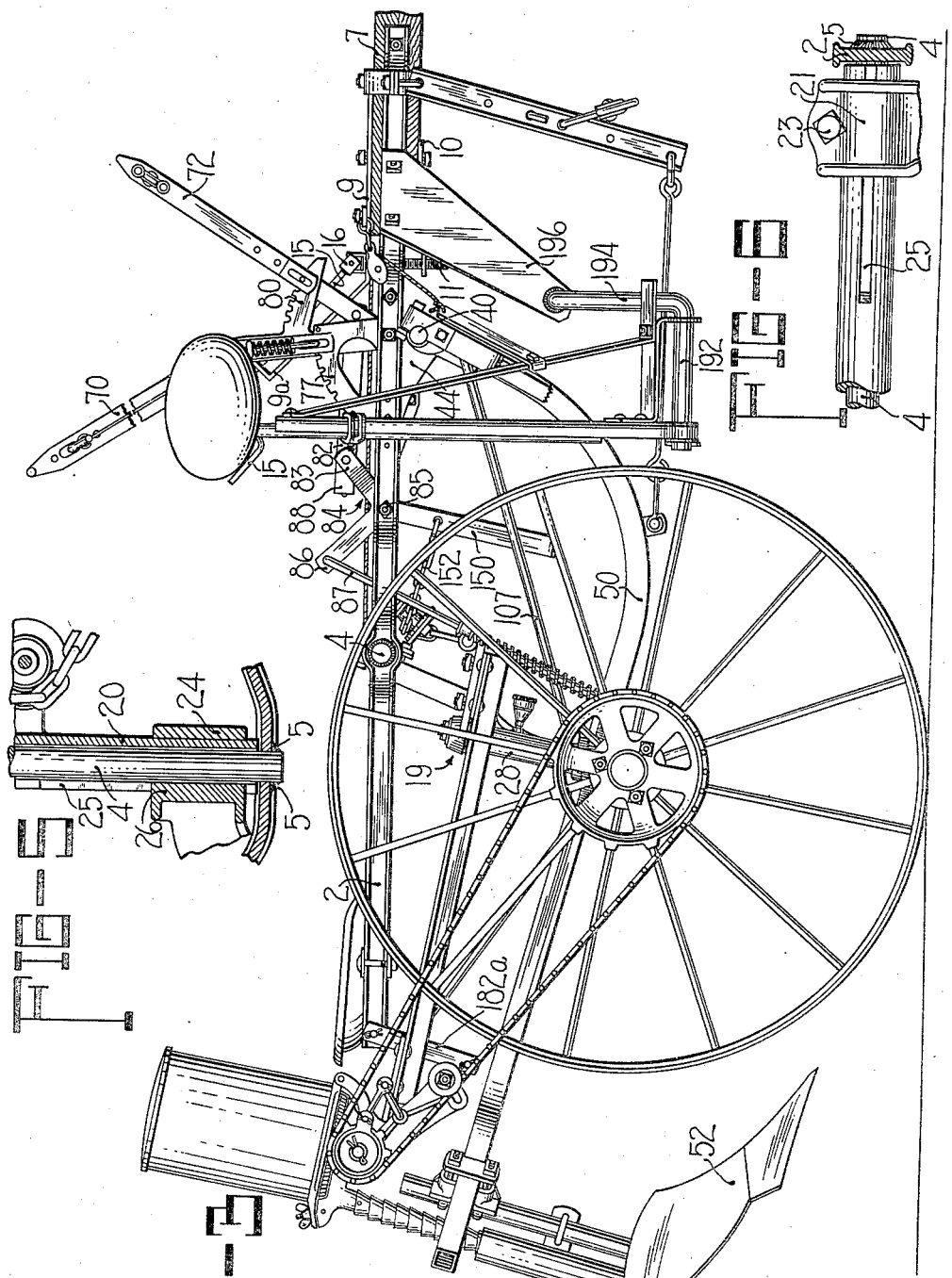

Nov. 2, 1937.  C. G. STRANDLUND  2,097,678
CULTIVATOR AND PLANTER
Filed Nov. 3, 1933  4 Sheets-Sheet 4
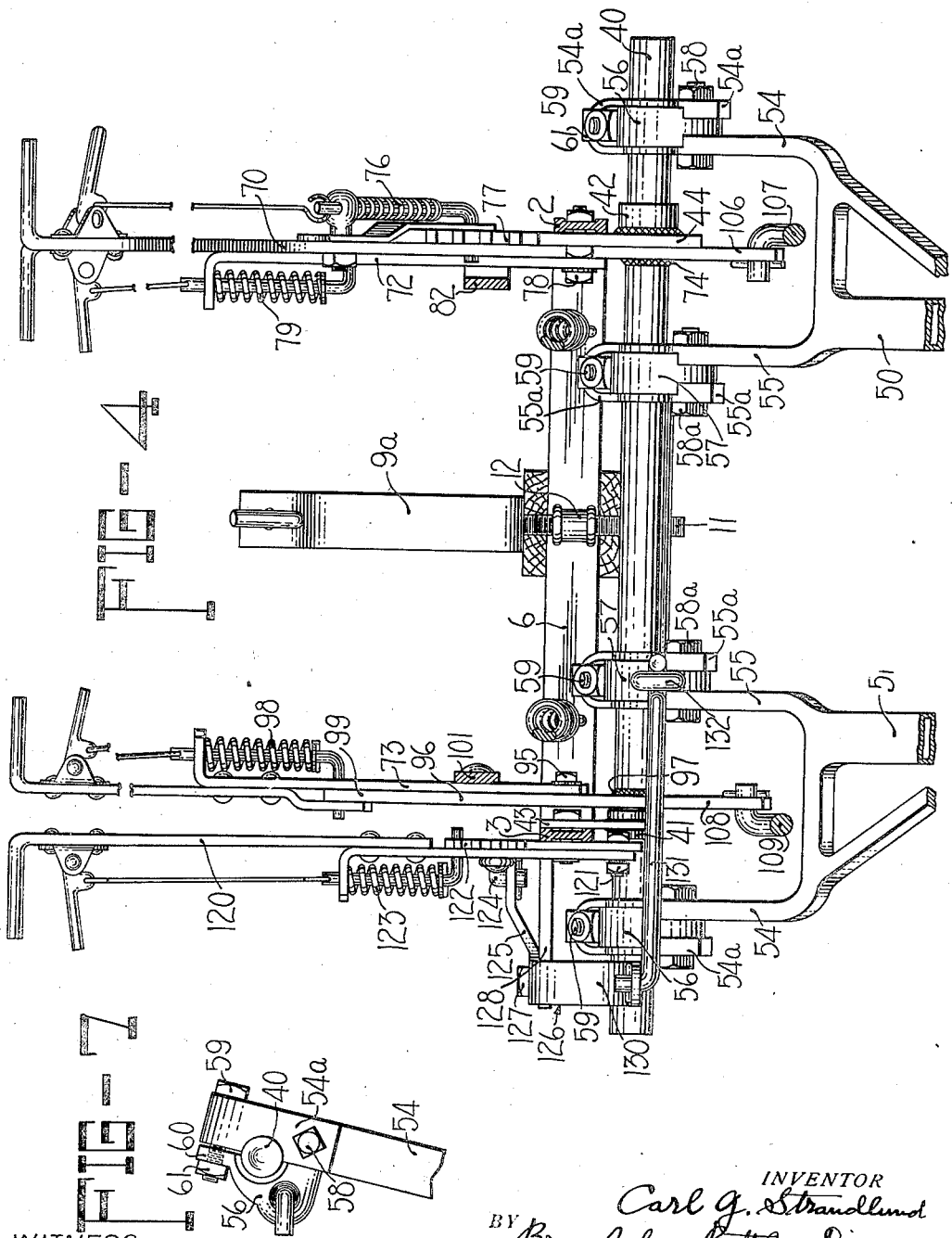
INVENTOR
Carl G. Strandlund
BY Brown, Jackson, Boettcher & Dienner
ATTORNEYS.
WITNESS.
Edward Melin.

Patented Nov. 2, 1937

2,097,678

UNITED STATES PATENT OFFICE 2,097,678

CULTIVATOR AND PLANTER

Carl G. Strandlund, Moline, Ill., assignor to Deere & Company, Moline, Ill., a corporation of Illinois Application November 3, 1933, Serial No. 696,481

23 Claims. (Cl. 111—60)

The present invention relates generally to agricultural implements and is specifically concerned with the provision of a cultivating implement adapted to receive a planting attachment so that the implement may be used for planting purposes as well as for cultivating purposes.

The principal object of the present invention is the provision of an agricultural implement embodying soil-working tools and associated planting means supported on the implement in a new and improved manner and in such way that, while the raising and lowering of the soil-working tools is accommodated, the planting means is disposed out of the way of the tools but in a relatively low position so as to provide a low center of gravity for the machine as a whole.

Heretofore, in agricultural implements of the lister type, the seed selecting mechanism and seed cans are supported on the main frame in some machines and in other machines they are supported directly on the beams to which the soil-working tools are connected. Both of these positions have certain more or less objectionable features which it is the purpose of the present invention to eliminate.

In a structure in which the seed selecting mechanism and associated parts are supported directly on the main frame of the implement, the seeding mechanism must be supported at a relatively high elevation so as not to interfere with the raising of the tool beams upon which the furrow openers are supported. This raises the center of gravity of the machine and makes it rather topheavy and unstable, especially when used on hillsides having more than a relatively gentle slope. Furthermore, where this type of construction is embodied in a machine in which the supporting wheels are shifted rearwardly when the tool beams are raised, some form of slack take-up device must also be provided in the driving train between the seed selecting mechanism and the driving wheel from which such mechanism is usually actuated.

In a structure in which the seed selecting mechanism and associated parts are mounted directly on the beams to which the tools or furrow openers are connected, it becomes necessary, in raising the furrow openers to inoperative position, to also raise the seed selecting mechanism, seed cans, and associated parts through the same range of movement as the furrow openers themselves. While this additional weight can be counterbalanced by using a stronger counterbalancing spring, nevertheless the greater extent of movement of these parts and the additional weight to be overcome when raising and lowering the furrow openers add considerably to the effort which must be expended in raising and lowering the tools.

According to the principles of the present invention, the seed selecting mechanism and seed cans are not supported on either the main frame of the implement, where they would be at a relatively high elevation, or on the tool beams, where the seed selecting mechanism and associated parts would have to move throughout the same range of movement of the tool beams. Rather, the present invention provides for supporting the seed selecting mechanism and associated parts so that they are raised when the tools are raised, but through a smaller distance and at a reduced rate relatively thereto. The principal advantage of this construction will at once be apparent. The seed selecting mechanism can be placed rather low on the machine and yet, by virtue of the upward movement thereof when the tools are raised, there is no interference between the tool beams and the seeding parts.

Another object of the present invention is to achieve the above mentioned advantages in an implement in the nature of a combined cultivator and seeder or planter.

According to the present invention, an object thereof is to provide a cultivator of the type having dirigible wheels mounted on spindles which are carried by generally vertically disposed sleeves which are mounted to swing fore and aft relative to the cultivator frame when the soil working tools are raised, and in this connection it is a further object of the present invention to mount the seed selecting mechanism and associated parts directly on the swingable wheel frame of which said sleeves are a part. Thus, when the furrow openers are raised the seed selecting mechanism and the seed cans are also raised, due to the fact that the wheel frame is swung rearwardly, but the vertical movement of the seed selecting mechanism is considerably less than the vertical movement of the furrow openers. As a result, the effort necessary to be expended in raising the furrow openers is not appreciably affected by the disposition of the seed selecting mechanism and seed cans on the wheel frame.

This disposition of the seed selecting mechanism and seed cans makes it possible, as mentioned above, to mount them considerably lower than is possible when they are mounted directly on the main frame of the implement, yet there is no interference in raising the furrow openers to inoperative position, because when the furrow openers are elevated the seed selecting mechanism and the seed cans are also raised a certain amount. Thus, the seed selecting mechanism and the seed cans can be carried at a substantially lower elevation than would be necessary if they were mounted on the main frame of the implement, but this positioning of the seed selecting mechanism and associated parts does not add materially to the load of raising the furrow openers out of the ground, as does an arrangement wherein the seed selecting mechanism is carried directly on the tool beams.

Still further, another object of the present invention is to provide a planter frame carrying the seed selecting mechanism and associated parts, which frame is adapted to be directly secured to the wheel frame and in such a manner that the wheels, which are dirigible wheels when the implement is used as a cultivator, are prevented from swinging about their vertical steering axes, thereby locking the wheels against turning, as is required when the implement is used as a planter.

An additional object of the present invention is the provision of new and improved means for raising and lowering the tool beams, particularly in connection with the provision of associated connections for raising and lowering the seed selecting mechanism which, as described above, is movably connected with the main frame by virtue of being mounted on the swingable wheel frame. The present invention contemplates employing a single rock shaft which not only serves as the principal part of the raising and lowering means for the tool beams, but which also serves as a supporting frame bar to which the forward ends of the tool beams are connected and are supported, in addition, for lateral shifting movement. This is a desirable feature in connection with the use of this machine as a cultivator.

These and other objects and advantages of the present invention will be apparent from the following detailed description of the preferred structural embodiment, taken in conjunction with the accompanying drawings illustrating such embodiment.

In the drawings:

Figure 2 is a side elevation of the machine shown in Fig. 1 arranged as a planter with the furrow openers in ground engaging or operative position;

Figure 3 is a side view of the machine with the furrow openers raised out of ground-engaging position and in inoperative position;

Figure 4 is an enlarged fragmentary section taken approximately along the line 4—4 of Figure 1;

Figure 5 is a fragmentary section taken along the line 5—5 of Figure 2;

Figure 6 is an enlarged section taken along the line 6—6 of Figure 2;

Figure 7 is an enlarged fragmentary side elevation, illustrating the connection between the forward ends of the tool beams and the rock shaft to which they are connected; and Figure 8 is a fragmentary view illustrating the connection between the steering means and the adjustable drag link means connected with the steering arms of the dirigible supporting wheels.

Figure 1:
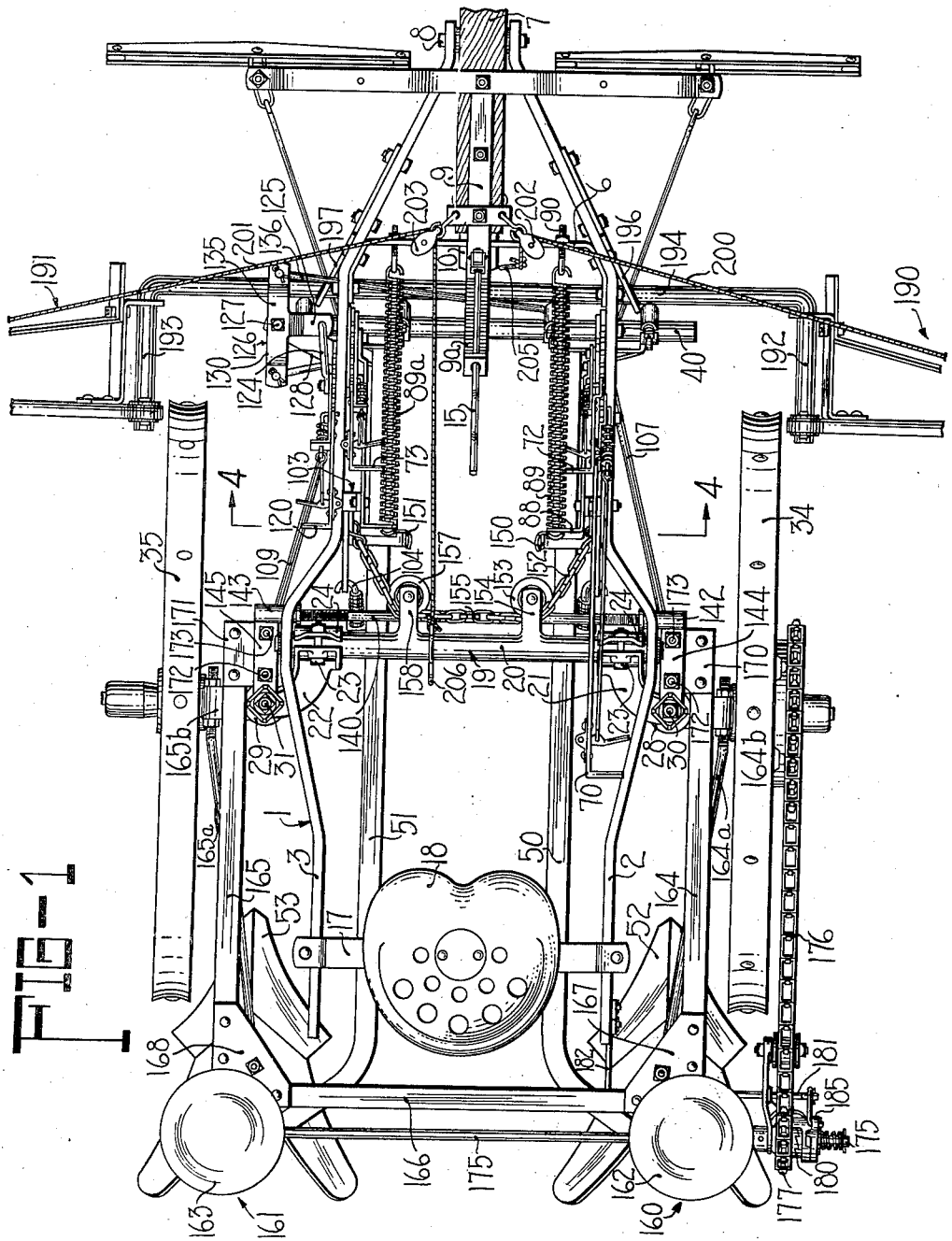
Figure 1 is a top plan view of an agricultural implement embodying the principles of the present invention.

Referring now to the drawings, the main frame 1 of the cultivator comprises a pair of generally longitudinally extending frame members 2 and 3 which are fixedly connected together by means of a centrally disposed transverse shaft or bar 4 which extends through perforations in the frame members 2 and 3 and is welded at its laterally outer ends to the frame members, as indicated at 5 in Figures 5 and 6. Near their forward ends the frame bars of members 2 and 3 are also connected together by means of a cross brace or transverse frame member 6. The ends of the frame bars 2 and 3 converge forwardly and are disposed on opposite sides of a pole or tongue 7 which is pivoted by means of a bolt 8 to the forward converged ends of the frame bars, as best shown in Figure 1.

The rear end of the pole 7 carries an upper plate 9 on its top face and a lower plate 10 on its bottom face, and these plates extend rearwardly on opposite sides of the cross brace 6. A screw 11 is journaled in aligned perforations in the upper and lower plates 9 and 10 and is threaded into a nut 12 supported, as best shown in Figure 4, by the frame member 6. The rear end of the upper plate 9 extends upwardly and rearwardly, as at 9a, and supports a crank screw 15 connected by means of a universal joint 16 with the screw 11. By rotating the crank 15 the screw 11 may be turned to shift the position of the rear end of the tongue 7 relative to the cross brace 6 and, hence, relative to the main frame 1 of the implement.

The rear ends of the frame members 2 and 3 are connected by a cross bar 17 which also carries a seat 18. The cross bar 17 may be adjusted fore and aft on the frame bars 2 and 3.

The main frame 1 of the cultivator is supported upon a wheel frame indicated in its entirety by the reference numeral 19 and consisting of parts serving as a wheel arch, the intermediate portion of which is pivoted to the main frame 1 and is provided with depending portions to which the supporting wheels are connected. The wheel frame or arch 19 consists of a pipe 20 journaled on the transverse shaft 4 which is fixed, as by welding, to the frame members 2 and 3, as described above. A pair of castings 21 and 22 are adjustably fixed to the opposite ends of the pipe 20 by means of bolts 23 and caps 24. The castings 21 and 22 are capable of adjustment laterally along the pipe 20, and to this end slots 25 are cut into the pipe adjacent the ends thereof, and into these slots are fitted keys 26 which are formed integral with the castings 21 and 22, as best shown in Figures 5 and 6. A particular advantage of this construction is that the full length of bearing of pipe 20 upon shaft 4 is had, regardless of the position of castings 21 and 22 upon pipe 20. By loosening the bolts 23 the castings 21 and 22 may be adjusted inwardly or outwardly on the pipe 20 to vary the spacing of the supporting wheels.

The castings 21 and 22 are provided, respectively, with sleeves 28 and 29 formed integral therewith and in which are journaled vertical spindles 30 and 31. These spindles are formed integral with the axles on which the supporting wheels 34 and 35 are journaled. The castings 21 and 22, together with the wheel spindles carried thereby and the pipe 20 upon which the castings are adjustably mounted, constitute the wheel frame unit or wheel arch which is pivotally connected with the main frame 1 about a transverse axis, whereby the wheel frame unit is capable of swinging fore and aft relative to the frame 1.

Near the forward end of the main frame 1 is a transverse rock shaft 40 which is journaled in bearings 41 and 42 and carried by brackets 43 and 44, respectively, depending from and secured to the frame bars 2 and 3. A pair of tool beams 50 and 51 are journaled at their forward ends upon the rock shaft 40, and furrow openers 52 and 53 are fixed to the rear ends of the beams 50 and 51 when the implement is used as a planter. When used as a cultivator without a planting or seeding attachment, the beams 50 and 51 support cultivator shovels or other tools.

Each of the tool beams 50 and 51 is forked at its forward end, laterally spaced arms 54 and 55 being thus provided, and these arms are journaled on and supported by the rock shaft 40. To this end, castings 56 and 57 are provided for each tool beam, and the end of each of the outer arms 54 is looped back upon itself, as best shown at 54a in Figures 4 and 7, and is thus adapted to embrace the casting 56, the latter being disposed between the arm 54 and the looped end 54a. The arm 54 is connected to the casting 56 by means of a bolt 58 which passes through the arm sections 54 and 54a. The arms 55 are mounted on the casting 57 carried by the shaft 40, the arms 55 having looped sections 55a embracing the castings 57 and secured thereto by bolts 58a.

As best shown in Figure 7, the castings 56 have semicircular depressions cooperating with similar semicircular depressions formed in the looped end of the arm 54 to receive the shaft 40. The construction of the arms 55 and the castings 57 is similar. The size of the openings thus provided for the shaft 40 may be adjusted by means of a bolt 59 which is disposed in the bight of the looped end of the associated arms and is threaded into a perforation formed in the associated casting, as indicated at 60. Each of the bolts 59 is locked in adjusted position by means of a lock nut 61. By virtue of this construction the forward ends of the beams 50 and 51 are mounted on the rock shaft 40 for both pivotal and lateral sliding movement.

Raising and lowering of the tool beams 50 and 51 is accomplished by pivoting the beams about the transverse pivot axis defined by the rock shaft 40. Such raising and lowering movements of the beams 50 and 51 are controlled by means of a master lever 70 and individual levers 72 and 73. The lever 70 is fixedly secured, as by welding, to the shaft 40, as shown at 74 in Figure 4, and a latch mechanism 76 is carried by the lever 70 and cooperates with a notched sector 77 which extends upwardly from and is preferably formed integral with the bracket 44, the latter being securely bolted to the frame bar 2.

The lever 72 is pivotally connected with the lever 70 by means of a pivot bolt 78 and carries a latch mechanism 79 which cooperates with a notched sector 80 fixed to the lever 70, as best shown in Figure 3. A link 82 is pivotally connected at one end with the lever 72 and at the other end with one arm 83 of a bell crank 84 which is pivotally mounted on the frame member 2, as at 85. The other arm 86 of the bell crank 84 is connected to a lifting rod 87, and the latter is connected with the beam 50. The link 82 is provided with a rearward extension 88, the rear end of which is bent at right angles and has connected thereto a counterbalancing spring 89, and the forward end of the latter is adjustably connected to the transverse brace 6 by means of a bolt 90, as best shown in Figure 1. Thus, with the master lever 70 latched to its sector 77, rocking of the lever 72 will rock the bell crank 84 and, in turn, raise or lower the tool beam 50.

For raising or lowering the other tool beam 51, similar mechanism is provided. Referring to Figure 4, the opposite lever 73 is pivotally connected at 95 to an arm 96 welded or otherwise securely fixed to the rock shaft 40, as indicated at 97. The lever 73 carries latch mechanism 98 which cooperates with a notched sector 99, preferably formed integral with the arm 96. The lever 73 is connected by means of a link 101 with one arm of a bell crank 103 (Fig. 1) which is pivotally mounted on the frame bar 3, and the other arm of the bell crank 103 is connected by means of a lifting rod 104 with the left-hand tool beam 51. A counterbalancing spring 89a is connected with a rearward extension of the link 101 and with the frame bar 6, similar to the counterbalancing spring 89 described above. With the master lever fixed in position, rocking the adjusting lever 73 will raise and lower the tool beam 51.

Rocking the master lever 70 causes a rocking movement of the shaft 40, and since, in the first place, the adjusting lever 72 is latched to a sector which is carried by the lever 70 and, in the second place, since the adjusting lever 73 is latched to a sector 99 which is fixed to the rock shaft 40, the rocking of the latter will raise both of the tool beams 50 and 51.

Reference is made above to the feature of having the wheel frame unit pivot with respect to the main frame when the tool beams are raised and lowered. Specifically, the wheel frame is pivoted in such a manner that the supporting wheels move rearwardly when the tool beams are raised, this being for the purpose of accommodating the increased load when the tools are raised out of the ground and to maintain the implement in balance. The means providing this construction in the present implement will now be described.

The lever 70, which is fixed to the rock shaft 40, extends below the latter and forms an arm 106 which, as best shown in Figure 4, is disposed between the arms 54 and 55 of the tool beam 50. The arm 106 is connected by means of a link 107 with the sleeve 28 on the casting 21. On the other side of the implement, the arm 96 is provided with a similar depending portion forming an arm 108 disposed between the arms 54 and 55 of the left-hand tool beam 51. The arm 108 is connected by means of a link 109 with the sleeve 29 on the casting 22.

By reason of the above described connections with the spindle sleeves 28 and 29, whenever the lever 70 is rocked to lift both of the tool beams 50 and 51, the pipe 20 and the castings 21 and 22 which are fixed thereto, together with the sleeves 28 and 29 formed integral with the castings 21 and 22, are all rocked rearwardly to compensate for the added weight disposed at the rear of the cultivator, due to the lifting of the furrow openers or other tools to maintain the cultivator in balance.

Mention is made above to the fact that not only are the forward ends of the tool beams 50 and 51 pivotally supported on the rock shaft 40, but that the tool beams are capable of lateral movement thereon for the purpose of varying the transverse spacing of the beams. The means for adjusting the beams 50 and 51 laterally will now be described.

A lever 120 is pivotally connected, as at 121 in Figure 4, to the lower portion of a notched sector 122 mounted on the frame member 3. The lever 121 carries a latch mechanism 123 which cooperates with the notches of the sector 122 in holding the lever 120 in adjusted position. The lever 120 is connected by means of a link 124 with an arm 125 formed on a T-lever 126 pivotally connected by means of a bolt 127 to the outer end of a bracket 128 carried by the frame member 3 and projecting laterally outwardly therefrom, as best shown in Figure 4. A downwardly inclined arm 130 is formed on the T-lever 126 and is connected by means of a link 131 to a perforated lug 132 formed integrally on and extending rearwardly from the casting 57 of the tool beam 51. An opposite arm 135 (Figure 1), also downwardly inclined, is connected by means of a link 136 to a perforated lug formed integral with and extending forwardly of the casting 57 for the other tool beam 50. Rocking the adjusting lever 120 will swing the T-lever 126, thereby causing the beams 50 and 51 to recede or approach each other.

The supporting wheels 34 and 35 of the implement are dirigible wheels and are connected together by means of a drag link 140. The ends of the drag link 140 are threaded, one being a right-hand thread and the other a left-hand thread, and are screwed, respectively, into sockets 142 and 143 pivotally carried at the outer ends of steering arms 144 and 145 which are fixedly secured, respectively, to the upper ends of the spindles 30 and 31.

The steering means for shifting the drag link 140 to steer the wheels 34 and 35 consists of a pair of foot pedals 150 and 151. The right-hand pedal 150 is journaled on the bolt 85 on which the bell crank 84 is pivoted, as best shown in Fig. 3, and the left pedal 151 is similarly supported. A chain 152 is connected at its forward end to the pedal 150 and is trained around a roller 153 supported between a pair of vertically spaced arms 154 extending forwardly from and preferably formed integral with the pipe member 20. The other end of the chain 152 is hooked into a T-shaped slot 155 (see Figure 8) formed in the upper end of a lug 155a which extends upwardly from and is securely fixed to the drag link 140, as by welding or the like. A chain 156 is provided for the left foot pedal 151 and is connected therewith at its forward end and with the lug 155a at its other end. The chain 156 passes around a roller 157 journaled between arms 158 extending forwardly from and formed integral with the pipe 20. Operating the foot pedals 150 and 151 in opposite directions steers the wheels 34 and 35.

When the wheels 34 and 35 are adjusted inwardly and outwardly by sliding the castings 21 and 22 inwardly or outwardly on the pipe 20, the corresponding adjustment of the drag link 140 is also made by unhooking the inner ends of the chains 152 and 156 from the lug 155a and then using the lug to rotate the drag link 140 to screw it into or out of the sockets 142 and 143, after which the inner ends of the chains 152 and 156 are again hooked to the lug 155a. When the chains 152 and 156 are hooked to the lug they effectively prevent any accidental rotation of the drag link 150. By virtue of this construction not only can the drag link 140 be used to adjust the steering mechanism for any lateral adjustment of the wheels 34 and 35, but also this means can be used for adjusting the gather or camber of the dirigible wheels.

The structure, so far as described above, is in the nature of a cultivator for cultivating row crops and the like and, to this end, the tool beams 50 and 51 may be provided with any form of cultivating means, such as shovels, discs and the like, and by virtue of the construction wherein the rock shaft 40 not only serves to raise and lower the tool beams but also serves as a support for the forward end of the tool beams, the vision had by the operator of the row being cultivated is greatly improved over such prior art constructions wherein a second rock shaft was provided for the raising and lowering means, in addition to a cross beam or bar upon which the cultivator beams were mounted.

The implement described above is adapted to receive a planting or seeding attachment and, according to the principles of the present invention, the planting attachment comprises a pair of seed selecting mechanisms 160 and 161 provided with seed cans 162 and 163, respectively. The seed selecting mechanisms are mounted on a planter frame consisting of a pair of longitudinally extending frame bars 164 and 165 connected together at their rear ends by a cross member 166, gusset plates 167 and 168 forming the connecting means between the longitudinal bars 164 and 165 and the transverse bar 166 and serving to rigidly connect these parts together. At the forward ends of the longitudinal members 164 and 165, plates 170 and 171 are riveted or otherwise securely fixed thereto, and these plates are, in turn, bolted by means of bolts 172 and 173 to the steering arms 144 and 145 carried by the steering wheel spindles 30 and 31. The frame of the planting attachment is further supported by means of a pair of downwardly and forwardly extending rods 164a and 165a which are connected at their rear ends to the gusset plates 167 and 168 and at their forward ends are disposed in perforated lugs 164b and 165b formed integral with the wheel frame sleeves 28 and 29, as best shown in Figure 1. The ends of the brace rods 164a and 165a connected with the perforated lugs are threaded to receive adjusting nuts disposed on opposite sides of the lugs associated therewith.

The seed selecting mechanisms 160 and 161 are driven by a common drive shaft 175 which is journaled on the planter frame and arranged transversely with respect to the implement. The drive shaft 175 is, in turn, driven by means of a chain 176 trained over a driven sprocket 177 fixed to the shaft 175 and over a driving sprocket 178 bolted or otherwise secured to the driving wheel 34. Suitable clutch mechanism is interposed between the shaft 175 and the sprocket 177 for interrupting the drive from the wheel 34 to the seed selecting mechanisms 160 and 161. Such clutch mechanism, indicated in its entirety by the reference numeral 180, comprises separable members of more or less conventional construction, which are controlled by means of a rock shaft 181 supported from the planting attachment frame. The rock shaft 181 is provided with an arm 182 formed on or carried by the inner end thereof, and the arm 182 is connected by means of a link 182a with the rear end of the frame bar 2, as best shown in Figure 2. The laterally outer end of the rock shaft 181 has an arm 183 formed thereon which is connected by means of a link 184 to a control member 185 forming a part of the clutch 180.

When the tool beams 50 and 51 are raised to their inoperative position, the wheel spindles 28 and 29 are rocked rearwardly about the axis of the pipe 20 and the fixed shaft 4, thereby causing the beams and planting mechanism to be moved from the position shown in Figure 2 to the position shown in Figure 3. Since the axis 4 about which the wheel frame swings is placed rearwardly of the axis 40 about which the tool beams swing, it will be clear that the rear ends of the tool beams will be raised farther and at a faster rate than the seed selecting mechanisms carried at the rear of the attachment frame, although it is true that when the tool beams are raised the seed selecting mechanisms and the seeder frame are also raised as the wheel frame is swung rearwardly. Due to the rigidity of the frame of the planting mechanism and its connection with the steering arms 144 and 145, the supporting wheels 34 and 35 are held against being rotated in the spindle sleeves 28 and 29.

During the raising movement and as the rear portion of the planter frame approaches the rear end of the main frame, the rock shaft 181 will be rocked, due to its connection with the main frame through the link 182a. Rocking of the rock shaft 181 will disengage the clutch 180, thereby disconnecting the power from the feed selecting mechanisms. It will also be observed that as the wheel frame swings rearwardly, the main frame swings downwardly to some extent about the forward support at the front end of the pole 7, whereby the weight of the operator aids in keeping the machine in balance.

When the implement is being used as a planter, a pair of markers 190 and 191 are mounted on the implement, preferably on the main frame thereof. These markers are pivotally carried on the rearwardly and longitudinally bent portions 192 and 193 of a transversely disposed member 194 which is, in turn, supported and rigidly fixed to a pair of brackets 196 and 197 bolted to the sides of the frame members 2 and 3 adjacent the forward ends thereof. The markers are raised and lowered by means of cables 200 and 201 which pass over pulleys 202 and 203. At their inner ends these cables are provided with hooks 205 and 206, either of which may be engaged over the pipe 20 to hold either or both of the associated markers in raised position. As shown in Figure 1, the left-hand marker 191 is in raised position while the right-hand marker 190 is in lowered position.

While I have described above the preferred construction in which the principles of the present invention have been embodied, it will be apparent that my invention is not to be limited to the specific details shown and described but that, in fact, widely different means may be employed in the practice of the broader aspects of my invention.

What I claim, therefore, and desire to secure by Letters Patent is:

1. An agricultural implement comprising, in combination, a main frame, supporting means therefor, a tool beam movably connected with the main frame, means for raising and lowering said beam, seed selecting mechanism pivotally connected with said frame separately from said beam and extending to a point in the path of movement of the latter, and means interconnecting the seed selecting mechanism with the tool beam for raising the seed selecting mechanism out of the way of the tool beam when the latter is raised.

2. An agricultural implement comprising, in combination, a main frame, a tool beam pivotally connected with the frame for vertical swinging movement, supporting means for the main frame including a wheel frame pivotally connected with the main frame for fore and aft swinging movement about an axis spaced from the pivot axis of said tool beam, a planter unit connected with and extending rearwardly from said wheel frame, means for raising and lowering said tool beam, and means including linkage interconnecting the tool beam and the wheel frame for raising and lowering the planter unit with the tool beam.

3. An agricultural implement comprising a main frame, a tool beam unit pivotally connected therewith for vertical swinging movement, a planter unit also pivotally connected with said frame for vertical swinging movement and including seeding mechanism, means for raising the tool beam unit, linkage connecting the tool beam unit with the planter unit for raising the latter therewith, and separate linkage extending between the planter unit and said main frame for interrupting the actuation of said seeding mechanism when said planter unit is raised.

4. An agricultural implement comprising a main frame, means serving as a wheel arch pivotally connected with the frame for fore and aft swinging movement, supporting wheels journaled on said arch means, a tool beam pivotally connected with said main frame for vertical swinging movement, a planter unit including a horizontally disposed planter frame rigidly connected with said arch means to swing therewith, means for raising and lowering said tool beam, and means connected to be operated therewith for swinging said wheel arch fore and aft as the tool beam is raised and lowered, said planter unit swinging vertically with said tool beam as the wheel arch is swung fore and aft.

5. An agricultural implement comprising, in combination, a main frame, a wheel frame unit mounted on side wheels and pivotally connected with the main frame for swinging movement about a transverse axis disposed forwardly of the axis of said side wheels, a planter unit carried by said wheel frame unit and including a planter frame rigidly connected therewith and planting means disposed rearwardly of said wheels, and means carried by the main frame for swinging said wheel frame unit about its axis and raising and lowering said planting means.

6. An agricultural implement comprising, in combination, a main frame, a wheel frame unit pivotally connected therewith and including side wheels journaled on the wheel frame, a planter frame rigidly secured to said wheel frame and extending rearwardly therefrom, seeding means mounted on the rear portion of said planter frame, driving means connecting one of said wheels with said seeding means, a soil-engaging tool movably carried by said main frame, and means for simultaneously raising and lowering said tool and swinging said wheel frame unit to raise and lower said seeding means.

7. The combination with an agricultural implement comprising a main frame, a wheel supported frame pivoted to said main frame, tool beams pivoted to said main frame for vertical movement, and means for raising said tool beams and for simultaneously swinging said wheel supported frame rearwardly relatively to said main frame, of a planting attachment comprising seed selecting mechanism supported on said wheel supported frame, and a driving connection between one of the wheels supporting the wheel supported frame and said seed selecting mechanism.

8. The combination with an agricultural implement comprising a main frame, a supporting frame pivotally connected with said main frame and including supporting wheels, tool beams pivoted to said main frame for vertical movement, and means for raising said tool beams and for simultaneously swinging said wheel supported frame rearwardly relatively to said main frame, of a planting attachment comprising an attachment frame adapted to be rigidly connected with said wheel supported frame to swing therewith, seed selecting mechanism supported on said attachment frame, a transverse seed feeding shaft journaled on said attachment frame in parallelism with respect to and spaced a fixed distance from the axis of said supporting wheels, and a driving connection between one of said supporting wheels and said seed feeding shaft.

9. The combination with an agricultural implement comprising a main frame and a wheel supported frame pivotally connected with said main frame, of a planting attachment comprising a planting unit rigidly connected with said pivoted wheel supported frame, driving means from one of the wheels of said frame to said planting unit and including a clutch, means for swinging said wheel supported frame rearwardly to raise said planting unit, and means carried by the rear portion of said main frame and actuated by relative movement between the attachment frame and said main frame for operating said clutch.

10. The combination with an agricultural implement comprising a main frame, a wheel supported frame pivoted to said main frame, tool beams pivoted to said main frame for vertical movement, and means for raising said tool beams and for simultaneously swinging said wheel supported frame rearwardly relatively to said main frame, of a planting attachment comprising an attachment frame supported on said wheel supported frame, seed selecting mechanism supported on said attachment frame, a driving connection between one of the wheels supporting the wheel supported frame and said seed selecting mechanism, a clutch for controlling said seed selecting mechanism, a control member for said clutch on said attachment frame, and a connection between said control member and said main frame whereby the control member is actuated by the relative movement occurring between said main frame and said attachment frame when said tool beams are lifted.

11. A combined planting and cultivating implement comprising a main frame, a wheel frame pivoted to said main frame, a pair of supporting wheels journaled on axles loosely mounted on said wheel frame, a planting attachment comprising a rigid attachment frame having seed selecting mechanism detachably supported thereon, and means for fixedly connecting said attachment frame to said loosely mounted axles to support the attachment frame on the wheel frame and to lock said axles against movement relative to said main frame.

12. A combined planting and cultivating implement comprising a main frame, a wheel frame pivotally connected with said main frame, a pair of supporting wheels journaled on axles loosely mounted on said wheel frame, arms carried by said axles, tool beams pivoted to said main frame for substantially vertical swinging movement, means for raising and lowering said tool beams, a planting attachment comprising a rigid attachment frame having seed selecting mechanism supported thereon, means for detachably connecting said attachment frame to said arms to support the attachment frame on said wheel frame for movement therewith and to lock said axles against movement relative to said main frame, and means for swinging said wheel frame about its pivot axis on the main frame for raising and lowering said seed selecting mechanism simultaneously with the operation of said raising and lowering means for said tool beams.

13. A planting attachment for an agricultural implement which includes a relatively high main frame, a wheel frame pivoted to said main frame, a pair of supporting wheels journaled on axles having spindles journaled in bearings on said wheel frame, and means for simultaneously rotating said spindles to steer said wheels, said planting attachment comprising a rigid attachment frame having seed selecting mechanism supported thereon, means for fixedly connecting said attachment frame to said wheel spindles to support the attachment frame on the wheel frame below the main frame and to lock said wheels against lateral angular displacement relative to said main frame, and marker supports comprising a pair of downwardly extending brackets adapted to be secured to said main frame and a transverse bar carried by the lower portions of said brackets and having down-turned marker receiving ends.

14. An agricultural implement comprising a main frame, means serving as a wheel arch pivotally connected with the frame for fore and aft swinging movement, supporting wheels journaled on said means, seeding mechanism rigidly connected with said means to move angularly therewith and disposed below said main frame and generally rearwardly of the axis of said supporting wheels, and means reacting against the main frame for swinging said first named means fore and aft and raising and lowering said seeding mechanism.

15. An agricultural implement comprising, in combination, a main frame, a wheel frame unit pivotally connected therewith and including side wheels journaled on the wheel frame, a planter frame connected with said wheel frame and extending rearwardly therefrom, seeding means mounted on the rear portion of said planter frame, driving means connecting one of said wheels with said seeding means, a soil-engaging tool, means interconnecting the tool with said seeding means whereby the tool is movable generally vertically when the seeding means is raised and lowered, and means for swinging said wheel frame unit to raise and lower said seeding means and said soil-engaging tool.

16. An agricultural implement comprising, in combination, a main frame, a wheel frame unit pivotally connected therewith and including side wheels journaled on the wheel frame, a planter frame rigidly secured to said wheel frame and extending rearwardly therefrom, seeding means carried by said planter frame, a soil-engaging tool, means interconnecting said tool and said seeding means whereby the tool is movable generally vertically when the seeding means is raised and lowered, and means for swinging said wheel frame unit to raise and lower said seeding means and said soil-engaging tool.

17. An agricultural implement comprising a main frame including a generally rearwardly disposed seat supporting section, means serving as a generally vertically disposed wheel frame pivotally connected with said main frame for fore and aft swinging movement, supporting wheels journaled on said wheel frame, a planter unit including a horizontally disposed planter frame rigidly connected with said wheel frame to swing therewith and extending rearwardly adjacent said seat supporting frame section, seed selecting drive mechanism carried by said unit and operatively connected with one of said supporting wheels to be actuated thereby, and means actuated by relative movement between said planter unit and seat supporting section and connected with the rear portion of the latter for interrupting said selecting drive mechanism.

18. A planting attachment for cultivators and similar machines having a fore and aft swinging wheel arch member, said attachment comprising a generally U-shaped frame having laterally spaced forwardly extending arms and a rear central section rigidly connected with said arms, seeding mechanism rigidly carried by said rear section to move bodily with said U-shaped frame, and means providing for the rigid attachment of the forward ends of said arms to said wheel arch.

19. The combination with an agricultural implement having a main frame, supporting wheels therefor, spindles upon which said wheels are journaled, means on the main frame receiving said spindles in non-rigid relation, and arms fixed to said spindles, of a planter unit comprising a rigid attachment frame including forwardly disposed portions and seed selecting mechanism mounted on said attachment frame, and means for fixedly connecting the forwardly disposed portions of said attachment frame to the arms of said spindles so as to hold said wheels in proper position relative to said planter unit.

20. The combination with an agricultural implement comprising a main frame, supporting wheels therefor having spindles by which the wheels are swingable laterally about generally vertical steering axes, tool means carried by said frame, and means operatively connecting said tool means with said wheels so that the lateral position of the latter determines the lateral position of the tool means relative to said frame, of a planter unit comprising a rigid attachment frame and seed selecting mechanism fixedly carried thereby and having parts operating adjacent said tool means, and means for fixedly connecting said attachment frame to said wheel spindles so as to prevent movement of the latter and hold said tool means in proper position with respect to said seed selecting mechanism parts.

21. The combination with an agricultural implement having a main frame, supporting wheels therefor, spindles upon which said wheels are journaled, means on the main frame receiving said spindles in non-rigid relation, arms fixed to said spindles, furrow opening tool means carried by said frame, and means operatively connecting said tool means with said wheels so that the lateral position of the latter determines the lateral position of the tool means relative to said frame, of a planter unit comprising a rigid attachment frame and seed selecting mechanism fixedly carried thereby and having seed depositing means acting to direct seed into the furrow opened by said tool means, and means for fixedly connecting said attachment frame to said wheel spindles so as to prevent movement of the latter and hold said tool means in proper position with respect to the seed depositing means of said planter unit.

22. An agricultural implement comprising a main frame, means serving as a wheel arch pivotally connected with the frame for fore and aft swinging movement, supporting wheels journaled on said means, a horizontally disposed planter frame rigidly connectd with said means to move angularly therewith and extending generally rearwardly of said wheels, and seeding mechanism carried on a portion of said planter frame that is disposed generally rearwardly of said wheels.

23. An agricultural implement comprising a main frame, means serving as a wheel arch pivotally connected with the main frame forward of the rear end thereof for fore and aft swinging movement, supporting wheels journaled on said means, a generally horizontally disposed planter frame rigidly connected with said means to move angularly therewith and extending generally rearwardly of said supporting wheels to a point adjacent the rear end of said main frame, and seeding mechanism mounted on the rear portion of said planter frame adjacent the rear end of said main frame and movable generally vertically with respect to the latter when said means is swung fore and aft relative to said main frame.

CARL G. STRANDLUND.